US011661011B2

(12) United States Patent
Loveday et al.

(10) Patent No.: US 11,661,011 B2
(45) Date of Patent: May 30, 2023

(54) CONTROL SYSTEM FOR A VEHICLE COMPARTMENT PLATFORM THAT IS SELECTIVELY MOVEABLE INTO MULTIPLE POSITIONS

(71) Applicant: Jaguar Land Rover Limited, Coventry (GB)

(72) Inventors: Duncan Loveday, Coventry (GB); Steven Thomas, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 1077 days.

(21) Appl. No.: 16/324,810

(22) PCT Filed: Aug. 30, 2017

(86) PCT No.: PCT/EP2017/071752
§ 371 (c)(1),
(2) Date: Feb. 11, 2019

(87) PCT Pub. No.: WO2018/041887
PCT Pub. Date: Mar. 8, 2018

(65) Prior Publication Data
US 2019/0176710 A1 Jun. 13, 2019

(30) Foreign Application Priority Data
Sep. 1, 2016 (GB) .................................... 1614795

(51) Int. Cl.
*B60R 5/04* (2006.01)
*B60P 1/00* (2006.01)
(Continued)

(52) U.S. Cl.
CPC ................ *B60R 5/041* (2013.01); *B60N 2/36* (2013.01); *B60P 1/003* (2013.01); *B60R 5/003* (2013.01)

(58) Field of Classification Search
CPC .......... B60R 5/041; B60R 5/00; B60R 5/003; B60R 5/006; B60R 5/04; B60R 5/042;
(Continued)

(56) References Cited

U.S. PATENT DOCUMENTS 3,627,158 A * 12/1971 Kobasic ................. B60R 5/04
414/462
3,727,976 A * 4/1973 Lystad .................. B60N 2/309
297/340
(Continued)

FOREIGN PATENT DOCUMENTS

DE 10 2004 003 405 A1 8/2005
DE 102004003405 A1 * 8/2005 .............. B60J 5/101
(Continued)

OTHER PUBLICATIONS

Patents Act 1977: Combined Search and Examination Report under Sections 17 and 18(3), UKIPO Application No. 1614795.1, dated Jan. 31, 2017, 7 pp.
(Continued)

*Primary Examiner* — Richard A Goldman
(74) *Attorney, Agent, or Firm* — Carlson, Gaskey & Olds, P.C.

(57) ABSTRACT

The present invention provides a control module (10) for controlling powered operation of a platform (2) for a vehicle compartment (101) that is movable between a first position in which the platform engages a moveable structure (102) of the vehicle (100) and a second position; wherein the control module (10) is configured to control movement of the platform (2) from the second position to the first position by first controlling a powered actuation means (5) to move the platform (2) from the second position through the first position and into a third position, and then controlling the powered actuation means (5) to move the platform (2) from the third position into contact with the moveable structure (102) to thereby bring the platform (2) into the first position.

20 Claims, 4 Drawing Sheets (51) Int. Cl.
  *B60N 2/36* (2006.01)
  *B60R 5/00* (2006.01)
(58) Field of Classification Search
  CPC . B60R 5/045; B60N 2/36; B60P 1/003; B60P 1/44; B60P 1/4407; B60P 1/4414; B60P 1/4421; B60P 1/4428; B60P 1/4435; B60P 1/4442; B60P 1/445; B60P 1/4485; B60P 1/4492
  USPC .......................................................... 701/49
  See application file for complete search history.

(56) References Cited

U.S. PATENT DOCUMENTS

| | | | | |
|---|---|---|---|---|
| 3,795,329 | A * | 3/1974 | Martin | B60P 1/4421 187/244 |
| 6,059,527 | A * | 5/2000 | Ranken | B60P 1/4435 414/545 |
| 6,779,824 | B1 * | 8/2004 | Lazarevich | B60P 3/36 296/57.1 |
| 11,279,300 | B1 * | 3/2022 | Line | B60N 2/6009 |
| 2003/0136595 | A1 * | 7/2003 | Lacy | B60R 5/042 180/89.1 |
| 2005/0088026 | A1 * | 4/2005 | Padberg | B60N 2/305 297/378.1 |
| 2005/0115154 | A1 | 6/2005 | Pantke et al. | |
| 2006/0108817 | A1 * | 5/2006 | DeLong | B60R 5/04 296/24.43 |
| 2007/0071567 | A1 * | 3/2007 | Lim | B60R 11/00 410/94 |
| 2008/0159839 | A1 * | 7/2008 | Gomes | B60P 1/4421 414/545 |
| 2008/0296929 | A1 * | 12/2008 | Suzuki | B60J 5/12 701/49 |
| 2011/0232195 | A1 | 9/2011 | Breitner et al. | |
| 2012/0234621 | A1 | 9/2012 | Syvret et al. | |
| 2016/0075270 | A1 * | 3/2016 | Walker | B60P 1/4421 414/540 |
| 2016/0280096 | A1 * | 9/2016 | Bonk | B60N 2/206 |
| 2016/0318453 | A1 * | 11/2016 | Kowalski | B60J 5/104 |
| 2016/0347209 | A1 * | 12/2016 | Pluta | B60N 2/0881 |
| 2018/0029515 | A1 * | 2/2018 | Raines | B60P 1/44 |
| 2019/0176710 | A1 * | 6/2019 | Loveday | B60N 2/36 |

FOREIGN PATENT DOCUMENTS

| | | | | |
|---|---|---|---|---|
| DE | 10 2006 046 345 A1 | | 4/2008 | |
| DE | 10 2012 024 931 A1 | | 6/2014 | |
| DE | 202015101409 U1 | * | 5/2015 | ............. B60P 1/433 |
| DE | 102016002886 A1 | * | 9/2017 | ............. B60R 13/08 |
| DE | 102017220197 A1 | * | 5/2019 | ........... A61G 3/0209 |
| GB | 2534905 A | * | 8/2016 | ............. B60R 5/041 |
| GB | 2534905 A | | 8/2016 | |
| GB | 2534906 A | * | 8/2016 | ............. B60R 5/041 |
| GB | 2534906 A | | 8/2016 | |
| GB | 2553318 A | * | 3/2018 | ............... B60J 5/10 |
| GB | 2567257 A | * | 4/2019 | ............. B60N 2/002 |
| JP | 2003-199793 A | | 7/2003 | |
| JP | 2006-219017 A | | 8/2006 | |
| WO | WO 2014/147414 A1 | | 9/2014 | |
| WO | WO-2016124727 A1 | * | 8/2016 | ............. B60R 5/041 |

OTHER PUBLICATIONS

Patents Act 1977: Search Report under Section 17(6), UKIPO Application No. 1614795.1, dated Aug. 11, 2017, 5 pp.
International Search Report and Written Opinion of the International Searching Authority, International Application No. PCT/EP2017/071752, dated Dec. 20, 2017, 13 pp.

* cited by examiner

CONTROL SYSTEM FOR A VEHICLE COMPARTMENT PLATFORM THAT IS SELECTIVELY MOVEABLE INTO MULTIPLE POSITIONS

RELATED APPLICATIONS

This application is a 35 U.S.C. § 371 national stage application of PCT Application No. PCT/EP2017/071752, filed on Aug. 30, 2017, which claims priority from Great Britain Patent Application No. 1614795.1, filed on Sep. 1, 2016, the contents of which are incorporated herein by reference in their entireties. The above-referenced PCT International Application was published in the English language as International Publication No. WO 2018/041887 A1 on Mar. 8, 2018.

TECHNICAL FIELD

The present disclosure relates to a control system for a platform that is deployable from a vehicle storage compartment. Aspects of the invention relate to a control module for controlling and/or monitoring operation of a platform, to a platform system, to a vehicle, and to a method of monitoring and/or controlling operation of a platform.

BACKGROUND

Many road vehicles include a storage compartment that is configured to be opened and closed by a tailgate. Some vehicles include a split tailgate arrangement including upper and lower panels that may each be pivoted outwardly in order to provide access to the storage compartment from the outside the vehicle. The lower panel may be configured to be opened into a deployed position in which the lower panel extends outwardly from the storage compartment and can be used as a seat or a loading platform. The upper and lower panels may each be configured to be held in defined closed positions by respective latch mechanisms. One or both of the upper and lower panels may be controlled by a powered actuation system, in which case the closed and latched positions of the upper and lower panels may be used as reference points for controlling deployment of the upper and lower panels.

It may also be desirable to provide a vehicle that does not include such a split tailgate arrangement with a deployable loading platform or seat that may be extended from a position within the storage compartment. However, it may be difficult to accurately control powered movement of such a platform if the platform does not include a latch mechanism for locking the platform in a defined start position.

It is an aim of the present invention to address disadvantages associated with the prior art.

SUMMARY OF THE INVENTION

According to an aspect of the present invention there is provided a control module for controlling powered operation of a platform for a vehicle compartment that is movable between a first position and a second position; wherein the control module is configured to control movement of the platform from the second position to the first position by first controlling a powered actuation means to move the platform from the second position through the first position and into a third position, and then controlling the powered actuation means to move the platform from the third position into contact with a moveable structure of the vehicle to thereby bring the platform into the first position.

According to a further aspect of the present invention there is provided a platform system for a vehicle having a compartment, for example a rear storage compartment, and a closure that is operable to open and close the compartment, for example a rear tailgate. The platform system may comprise a platform that is movable, for example pivotable, between a first position in which the platform is located within the compartment and a deployed position in which platform extends outwardly from the compartment. The platform system may further comprise a powered actuation means configured to control movement of the platform. The platform system may further comprise a control module configured to control operation of the powered actuation means. Movement of the tailgate may be controlled by separate powered actuation means, the operation of which may also be controlled by the control module.

By first moving the platform into the third position the control module is able to ensure that the moveable structure does not impact the platform during movement of the moveable structure. The moveable structure may be, for example, a tailgate or a seat back or any other moveable structure that interacts with a platform within a vehicle.

In addition, by subsequently moving the platform from the third position into contact with the moveable structure to thereby bring the platform into the first position the control module is able to return the platform to a known position defined by engagement with the moveable structure. It is therefore not necessary to move the platform into a hard stop position at an end (for example an inner-most end) of its travel or include a latch system for the platform (that would add to the cost and complexity of the platform system and intrude into the vehicle compartment) in order to return the platform to a known position before the start of the next movement of the platform. It is then possible to use this known position as a reference point for monitoring and/or controlling subsequent movement of the platform.

It will be appreciated that the control module may be configured to move the platform from the second position through the first position and into the third position either while the moveable structure is in a fully open position or while the closure is in a partially open position (including during closing movement of the moveable structure), provided that the platform is able to complete its movement without colliding with the moveable structure. Similarly, it will be appreciated that the control module may be configured to move the platform from the third position back towards the first position either while the moveable structure is in a fully closed position or while the moveable structure is in a partially open position (including during closing movement of the moveable structure), although the platform preferably only contacts the moveable structure after the moveable structure has reached its fully closed position. The control module may be configured to move the platform into contact with the moveable structure directly after the moveable structure has reached its fully closed position, although in other cases movement of the platform into contact with the moveable structure may occur at a later time, for example directly before the next opening operation of the closure. The fully closed position is typically a hard stop position.

The compartment may be a storage compartment, for example a main storage compartment located at the rear of a vehicle. Alternatively the compartment may be another type of vehicle compartment, for example a passenger compartment.

The platform may be pivotable between the first position and the second position. The first position may be a position in which the platform is located in the compartment and engages the moveable structure when the moveable structure is in a hard stop position. The second position may be a deployed position in which the platform extends outwardly from the compartment and is usable as a platform. The third position may be a temporary stowage position inboard of the first position into which the platform is movable before subsequent movement of the platform into the first position.

The third position may be a soft stop position into which the control module is configured to move the platform before subsequent movement of the platform into the first position.

It will be appreciated that the term "soft stop position" refers to a position that is not a hard stop position of maximum possible displacement for the platform, for example as defined by the operational limit of a hinge mechanism or an actuation device. In this case the third position is in between the position of maximum possible retraction and the first position. The use of a soft stop position helps to reduce wear and fatiguing of the components of the platform system and to minimise the noise generated by the platform system in use.

The second position may be a soft stop position. In this case the second position may be inboard of a position of maximum possible deployment for the platform. The platform may be movable beyond the second position (in a direction away from the first position) by manual loading. The control module may be configured to automatically return the platform to the second position if the platform is manually moved out of the second position (for example beyond the second position in a direction away from the first position).

The control module may be configured to monitor the position of the platform. The control module may, for example, be configured to monitor the position of the platform during deployment operations, while the platform is deployed, and/or during retraction operations. However, the control module may be configured to switch off or otherwise stop monitoring the position of the platform after the platform has been retracted, for example into the first position. In this case the control module may remain off or otherwise not monitor the position of the platform until the start of the next deployment operation.

The control module may be configured to monitor the position of the platform in dependence on a signal received from a sensor associated with the powered actuation means, for example a Hall effect sensor located in or on the powered actuation means.

The control module may be configured to monitor the position of the platform by counting sensor signals, for example Hall effect sensor signals, generated in dependence on movement of the platform and/or operation of the powered actuation means.

The control module may be configured to monitor the position of the platform by tracking movement of the platform relative to a reference point. Movement of the platform may be tracked indirectly, for example by tracking movement of the powered actuation means.

The control module may be configured to use the first position as a reference point for monitoring movement of the platform. For example, the control module may be configured to automatically determine that the platform is in the first position before the start of a deployment operation (this being the position that the platform is known to have been brought to at the end of the previous retraction operation), and to determine the position of the platform during a deployment operation, while the platform is deployed, and during a retraction operation by tracking movement of the platform relative to the reference point.

The control module may be configured to use the first position as a reference point for controlling movement of the platform. For example, the control module may be configured to assume that the platform is in the first position before the start of a deployment operation (this being the position that the platform is known to have been brought to at the end of the previous retraction operation), and to move the platform into the second position by moving the platform towards the second position over a predetermined distance corresponding to the distance between the first position and the second position. Similarly, the control module may be configured to move the platform back into the third position by moving the platform until it is determined that the platform is located inboard of the first position by a predetermined distance corresponding to the distance between the first position and the third position.

The control module may be configured to detect when the platform has moved into contact with the moveable structure by detecting a change (for example an increase) in current and/or voltage at the powered actuation means and/or by detecting a change (for example a decrease) in the operating speed of the powered actuation means.

The control module may be configured to stop powering the powered actuation means when it is determined that the platform has moved into contact with the moveable structure. The powered actuation means may be configured to stall when the platform moves into contact with the moveable structure.

The control module may be configured to prevent the moveable structure from impacting the platform during powered movement of the moveable structure to the hard stop position and/or to prevent the platform from impacting the moveable structure during powered retraction of the platform, for example by avoiding moving the moveable structure while the platform is in a collision zone and/or by avoiding retracting the platform while the moveable structure is in a collision zone.

According to a further aspect of the present invention there is provided a control module for monitoring and/or controlling movement of a platform for a vehicle compartment, wherein the control module is configured to use a soft start position that is outboard of a position of maximum possible retraction for the platform and in which the platform engages a moveable structure for the compartment when the moveable structure is in a hard stop position as a reference point for monitoring and/or controlling movement of the platform. The control module may be configured to move the platform into the soft start position by first controlling a powered actuation means to move the platform through the soft start position and into a position inboard of the soft start position, and then controlling the powered actuation means to move the platform into contact with the moveable structure to thereby bring the platform into the soft start position. It will be appreciated that the soft start position is a start position that is not a hard stop position of maximum possible displacement for the platform, for example as defined by the operational limit of a hinge mechanism or an actuation device, although the platform may be brought to rest in the soft start position by contact with the moveable structure.

According to a further aspect of the present invention there is provided a platform system for a vehicle, the platform system comprising a control module as described above.

The platform system may further comprise a platform for a vehicle storage compartment that is movable between a first position in which the platform engages a moveable structure of the compartment when the moveable structure is in a hard stop position, and a second position.

The platform system may further comprise a powered actuation means for controlling movement of the platform. Operation of the powered actuation means may be controlled by the control module.

The platform may be pivotably mounted to the vehicle.

The platform may be mounted to the vehicle by a hinge. The hinge may have a fixed pivot axis such that the platform pivots with pure rotational movement, or alternatively the hinge may permit pivoting of the platform with a combination of rotational and translational movement.

The hinge may be configured to retain the platform in a start position under friction. In this way the platform may conveniently be retained in the start position after the completion of a retraction operation until the start of the next deployment operation without any need to continue powering the actuation means. The start position may, for example, be the first position (in which the platform engages the closure).

The platform may be configured to be used as a seat and/or as a loading platform when in the second position. The platform may further be configured to act as a catcher or holder when in the first position and/or the third position, for example to catch or hold items in the compartment, especially when the moveable structure is in an open position.

The platform may extend substantially across the width of an opening of the compartment that is opened and closed by the moveable structure. The platform may have a height that is within 10% to 70% or 20% to 40% of the height of the opening of the compartment. The platform may be at least substantially planar.

The first position of the platform may be a substantially vertical position (for example with the plane of the platform being within 20 degrees of vertical when the vehicle is on flat level ground). The second position of the platform may be a substantially horizontal position (for example with the plane of the platform being within 20 degrees of horizontal when the vehicle is on flat level ground).

According to a further aspect of the present invention there is provided a platform system for a vehicle having a compartment and a moveable structure that is operable to open and close the compartment, the platform system comprising: a platform that is movable between a first position in which the platform engages the moveable structure when the moveable structure is in a hard stop position, and a second position; and a powered actuation means configured to control movement of the platform; wherein the platform system is configured to move the platform from the second position to the first position by first operating the powered actuation means to move the platform from the second position through the first position and into a third position, and then operating the powered actuation means to move the platform from the third position into contact with the moveable structure to thereby bring the platform into the first position. The platform system may include a control module as described above that is configured to control operation of the powered actuation means.

According to a further aspect of the present invention there is provided a vehicle comprising a control module as described above and/or a platform system as described above. The vehicle may be an automotive vehicle such as a car.

According to a further aspect of the present invention there is provided a method of moving a platform of a vehicle compartment from a second position to a first position in which the platform engages a moveable structure for the compartment when the moveable structure is in a closed position, the method comprising: operating a powered actuation means to first move the platform from the second position through the first position and into a third position; and then operating the powered actuation means to move the platform from the third position into contact with the moveable structure to thereby bring the platform into the first position. The platform may be moved from the second position through the first position and into the third position either while the moveable structure is in a fully open position or while the moveable structure is in a partially open position (including during closing movement of the moveable structure), provided that the platform is able to complete its movement without colliding with the moveable structure. The platform may be moved from the third position back towards the first position either while the moveable structure is in a fully closed position or while the moveable structure is in a partially open position (including during closing movement of the moveable structure), although the platform preferably contacts the moveable structure only after the moveable structure has reached its fully closed position.

According to a further aspect of the present invention there is provided a method of monitoring and/or controlling movement of a platform of a vehicle compartment, the method comprising: using a soft start position that is outboard of a position of maximum possible retraction for the platform and in which the platform engages closure moveable structure for the compartment when the moveable structure is in a hard stop position as a reference point for monitoring and/or controlling movement of the platform. The method may further comprise moving the platform into the soft start position by first moving the platform through the soft start position and into a position inboard of the soft start position, and then moving the platform into contact with the moveable structure to thereby bring the platform into the soft start position.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
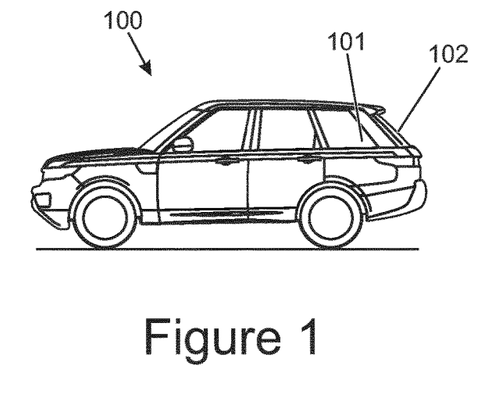
FIG. 1 illustrates a vehicle including a storage compartment with a deployable platform.

FIG. 1 illustrates a vehicle 100 comprising a rear storage compartment 101 located towards the rear of the vehicle. The storage compartment is provided with a platform system 1 according to one possible embodiment of the present invention, as schematically illustrated in FIG. 2.

The vehicle 100 includes a tailgate 102 for opening and closing the storage compartment 101. The tailgate 102 is a moveable vehicle structure that is coupled to the vehicle 100 by a hinge located at an upper edge thereof, and is pivotable relative to the vehicle 100 between a closed position in which the tailgate 102 covers an opening formed in the rear face of the vehicle to thereby close the storage compartment 101 (as illustrated in FIG. 2), and a fully open position in which the opening is uncovered to allow access to the storage compartment 101 from outside the vehicle 100. It will be appreciated that many different types of hinges are possible for the tailgate 102, and that movement of the tailgate 102 between the closed and fully open positions is not required to be pure rotational movement about a fixed pivot axis. The tailgate 102 is provided with a latch at a lower edge thereof that is configured to mate with a striker provided at a fixed point on the vehicle 100 in order to releasably retain the tailgate 102 in the closed position until it is desired to open the storage compartment 101.

Figure 2:
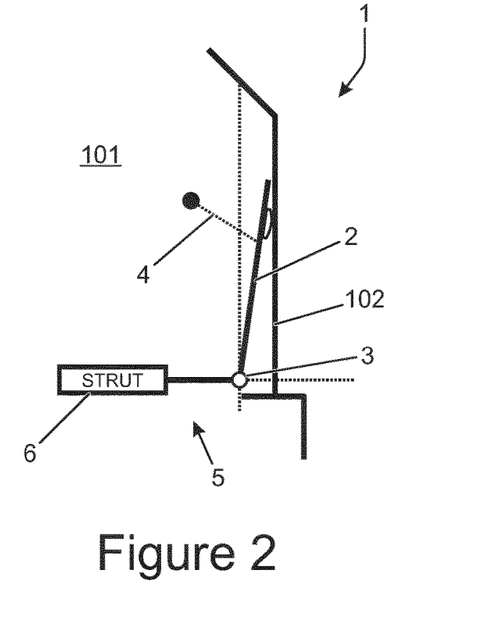
FIGS. 2 to 7 schematically illustrate various positions into which the deployable platform may be moved during deployment operations.
Figure 8:
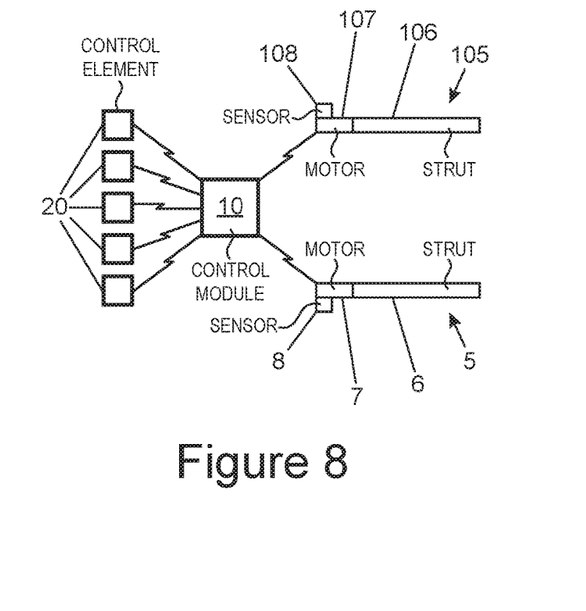
FIG. 8 schematically illustrates a control system for controlling powered operation of the platform.

The tailgate 102 is a powered tailgate that is configured to be selectively opened and closed by a first actuation system 105 (not shown in FIG. 2, but illustrated schematically in FIG. 8). In the present embodiment the first actuation system 105 comprises at least one extensible strut 106 that is coupled to the tailgate 102 and to a fixed point on the vehicle 100, and an electric motor 107 that is operable to drive the strut 106 to thereby control the position of the tailgate 102. The strut 106 may be arranged at any appropriate angle and may be coupled to the tailgate 102 at any suitable location, including via a bracket extending outwardly from the tailgate 102. Operation of the first actuation system 105 is controlled by a control module 10 located within the vehicle 100, as illustrated schematically in FIG. 8.

The fully open position of the tailgate 102 is a calibrated soft stop position that is inboard of the position of maximum possible opening permitted by the tailgate hinge and the first actuation system 105. The fully open position may, for example, be set at 98% of the travel from the closed position towards the position of maximum possible opening. The closed position of the tailgate 102 is a hard stop position defined by engagement of the tailgate latch with the fixed striker.

Figure 3:
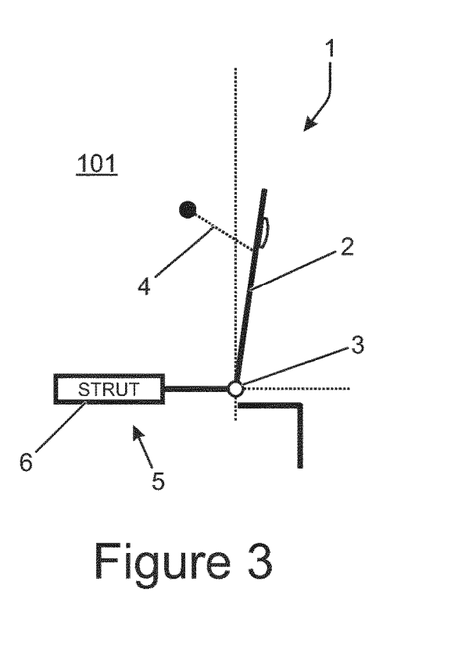
Figure 4:
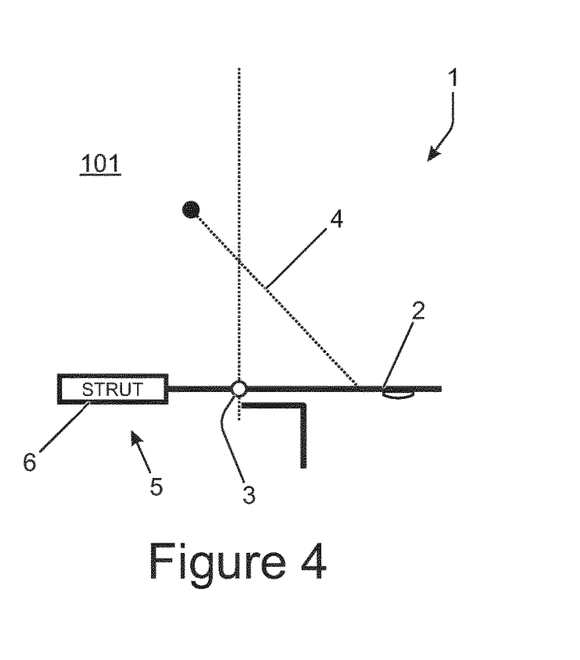

The vehicle further comprises a platform 2 located within the storage compartment 101 that is configured to be deployed from a substantially vertical first position or start position within the storage compartment 101, as illustrated in FIGS. 2 and 3, to a substantially horizontal second position or deployed position, as illustrated in FIG. 4, in which the platform 2 extends outwardly from the storage compartment 101 and can be used, for example, as a loading platform or a seat. The side of the platform 2 that faces upwardly when the platform 2 is in the deployed position may be padded, although the padding may optionally be removable.

The platform 2 is coupled to the vehicle by a hinge 3 located at a lower edge thereof and is configured to be pivoted relative to the vehicle 100 between the start position and the deployed position. As with the tailgate 102 described above, it will be appreciated that many different types of hinges are possible for the platform 2, and that movement of the platform 2 between the start position and the deployed position is not required to be pure rotational movement about a fixed pivot axis. The platform 2 is provided with a cable stay 4 at each side edge thereof. The cable stays 4 are each coupled to fixed points on the vehicle 100, and act to damp movement of the platform 2 towards the deployed position and to provide additional support to the platform 2 while in the deployed position. The platform 2 forms an internal part of the vehicle 100 and is located fully inside the storage compartment 101 when in the start position, and inboard of the tailgate 102 when the tailgate is in the closed position.

The platform 2 is a powered platform that is configured to be selectively moved between the start position and the deployed position by a second actuation system 5. In the present embodiment the second actuation system comprises at least one extensible strut 6 that is coupled to the platform 2 and to a fixed point on the vehicle 100, and an electric motor 7 that is operable to drive the strut 6 to thereby control the position of the platform 2. The simplified view of FIG. 2 illustrates the strut 6 as being substantially horizontal and coupled to the platform 2 at the location of the hinge 3, although it will be appreciated that the strut 6 may be arranged at any appropriate angle and may be coupled to the platform 2 at any suitable location, including via a bracket extending outwardly from the platform 2. Operation of the second actuation system 5 is controlled by the control module 10, as illustrated schematically in FIG. 8 (although in other embodiments separate control modules may be used to control the first and second actuation systems 105, 5).

The deployed position of the platform 2 is a calibrated soft stop position that is inboard of the position of maximum possible deployment permitted by the platform hinge 3 and the second actuation system 5. The deployed position may, for example, be set at 98% of the travel from the start position towards the position of maximum possible deployment. The start position of the platform 2 is a position in which the platform 2 rests against the inner surface of the tailgate 102 when the tailgate is in the closed position. The platform 2 is provided with a pad on its side facing towards the tailgate 102 that is configured to provide a soft surface via which the platform 2 can engage the tailgate 102 while the platform 2 is in the start position and the tailgate 102 is in the closed position.

The platform system 1 is configured to operate the second actuation system 5 to return the platform 2 into the start position in contact with the inner surface of the tailgate 102 at the end of all deployment and retraction operations, as described in more detail below. The platform hinge 3 is configured to hold the platform 2 in this start position under friction until the second actuation system 5 is subsequently operated to move the platform 2 out of the start position.

Each of the first and second actuation systems 105, 5 is provided with a sensor 108, 8, for example a Hall effect sensor, as schematically illustrated in FIG. 8. Each of the first and second sensors 108, 8 is configured to output sensor signals, for example Hall effect sensor signals, in dependence on operation of its respective actuation system 105, 5, for example in dependence on extension and retraction of the strut or rotation of the motor. The control module 10 is configured to receive sensor signals from each of the first and second sensors 108, 8, and to determine the real-time positions of the tailgate 102 and the platform 2 by counting the received sensor signals, as described in more detail below with reference to example modes of operation.

The control module 10 is also configured to receive command signals containing requests related to the operation of the tailgate 102 and/or the platform 2 generated in response to a user operating one of a plurality of user-operable control elements 20. The control elements 20 may include, for example, a plurality of buttons located on a dashboard of the vehicle for requesting: opening of the tailgate and deployment of the platform; opening of the tailgate alone; retraction of the platform and closing of the tailgate; and closing of the tailgate alone. The control elements 20 may also include, for example, a button on the outside of the vehicle for requesting opening of the tailgate alone, a button on the inside of the tailgate for requesting closing of the tailgate alone, a button on the platform for requesting deployment of the platform or retraction of the platform (in dependence on the current position of the platform), and one or more buttons located on an external device such as a separate fob. The control elements 20 may also include one or more sensors for detecting gestures made by a user. The control module 10 is configured to determine whether or not a particular operation, for example a requested operation, should be carried out, and to output control signals to control the first and second actuation systems 105, 5 if it is determined that a particular operation should be carried out.

Example modes of operation of the platform system 1 will now be described with reference to FIGS. 2 to 7.

FIG. 2 schematically illustrates the storage compartment 101 of the vehicle 100 while the tailgate 102 is in the closed position and the platform 2 is in the start position. If it is desired to move the tailgate 102 into the fully open position and the platform 2 into the deployed position, a user of the vehicle 100 may operate a button located on the dashboard of the vehicle in order to generate a command signal requesting opening of the tailgate 102 and deployment of the platform 2, which is received at the control module 10. In order to open the tailgate 102 the control module 10 first outputs a latch release control signal instructing the tailgate latch to release the striker to thereby unlock the tailgate 102. The control module 10 then controls the first actuation system 105 to move the tailgate 102 from the closed position into the fully open position. FIG. 3 schematically illustrates the storage compartment 101 after the tailgate 102 has been moved out of the closed position (and out of the field of view of FIG. 3) while the platform 2 remains in the start position. After the tailgate 102 has been moved into the fully open position (or alternatively during movement of the tailgate 102 towards the fully open position), the control module 10 controls the second actuation system 5 to move the platform 2 from the start position into the deployed position, as schematically illustrated in FIG. 4.

When the control module 10 is switched on in order to control operation of the tailgate 102 and the platform 2 it knows the exact position of the tailgate 102 because the tailgate 102 is held in its closed position by the tailgate latch and the fixed striker until the start of the opening operation. The location of the tailgate 102 in the closed position may be confirmed to the control module 10 by a sensor in the latch mechanism. The control module 10 is therefore able to reliably determine the real-time position of the tailgate 102 during opening operations and ensure that the tailgate 102 is moved accurately into the fully open position by counting the sensor signals received from the first sensor 108 during opening of the tailgate 102 to thereby track movement of the tailgate 102 relative to the known closed position. For example, if movement of the tailgate 102 from the closed position into the fully open position corresponds to 100 sensor signals then the control module 10 may control the first actuation system 105 to move the tailgate 102 towards the fully open position for a count of 100 sensor signals. It is therefore possible to move the tailgate 102 into the calibrated fully open position without reaching the hard stop position of maximum possible opening permitted by the tailgate hinge and the first actuation system 105.

In contrast to the tailgate 102, the platform 2 is not provided with any latch mechanism for retaining it in the start position between deployments. However, since the platform 2 is returned to a known start position (in which the platform 2 is in contact with the tailgate 102 while the tailgate remains in the closed position) at the end of all deployment operations (as described in more detail below) and held in this position by friction in the hinge 3 until the next deployment operation, it is possible for the control module 10 to assume after being switched on to commence a deployment operation that the platform 2 is in the start position, and to use the start position as a reference point for monitoring the position of the platform 2 and controlling movement of the platform 2. The control module 10 can therefore determine the real-time position of the platform 2 during deployment operations and ensure that the platform 2 is moved accurately into the deployed position by counting the sensor signals received from the second sensor 8 during deployment of the platform 2 to thereby track movement of the platform 2 relative to the known start position. For example, if movement of the platform 2 from the start position into the deployed position corresponds to 100 sensor signals then the control module 10 may control the second actuation system 5 to move the platform 2 towards the deployed position for a count of 100 sensor signals. It is therefore possible to move the platform 2 into the calibrated fully deployed position without reaching the hard stop position of maximum possible deployment permitted by the platform hinge 3 and the second actuation system 5.

The control module 10 remains awake and continues to monitor the real time positions of the tailgate 102 and the platform 2 by counting sensor signals from the first and second sensors 108, 8 until the tailgate 102 has been returned to the closed position and the platform 2 has been returned to the start position so that subsequent control operations for the tailgate 102 and the platform 2 may be controlled accurately and so that collisions between the tailgate 102 and the platform 2 may be prevented.

Figure 5:
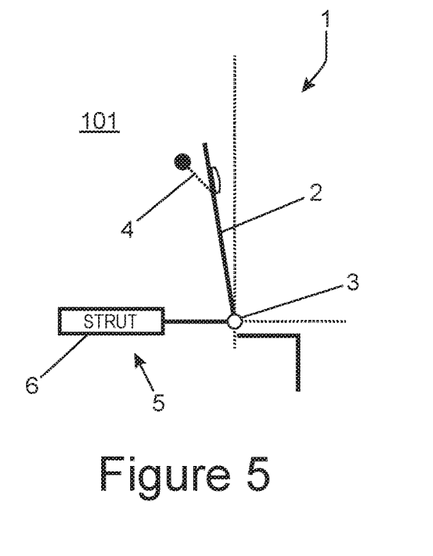

If it is subsequently desired to retract the platform 2 and close the tailgate 102, a user of the vehicle 100 may operate another button located on the dashboard of the vehicle in order to generate a command signal requesting retraction of the platform 2 and closing of the tailgate 102 which is received at the control module 10. In order to retract the platform 2, the control module 10 first controls the second actuation system 5 to move the platform 2 from the deployed position through the start position and into a third position or temporary stowage position inboard of the start position, as schematically illustrated in FIG. 5.

The temporary stowage position is a calibrated soft stop position that is outboard of the position of maximum possible retraction permitted by the platform hinge 3, the second actuation system 5, and the geometry of the platform 2 and the storage compartment 101 ("outboard of" meaning further towards the deployed position). The temporary stowage position may, for example, be set at 98% of the travel from the deployed position towards the position of maximum possible retraction. Alternatively the temporary stowage position may be set at a fixed displacement (for example a fixed number of sensor signals) inboard of the start position.

The control module 10 is able to accurately move the platform 2 from the deployed position into the temporary stowage position by continuing to count sensor signals from the second sensor 8 to thereby monitor the real-time position of the platform 2. For example, if the platform 2 is in the deployed position with a signal count of +100 at the start of a retraction operation and the temporary stowage position is known to be −10 sensor signals inboard of the start position then the control module 10 controls the second actuation system 5 to retract the platform 2 for a count of 110 sensor signals to thereby move the platform 2 from the deployed position through the start position and into the temporary stowage position.

Figure 6:
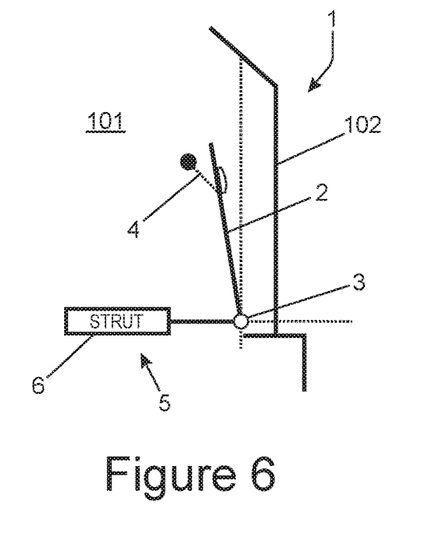

Once the platform 2 has moved inboard of the start position, for example into the temporary stowage position, the control module 10 then controls the first actuation system 105 to move the tailgate 102 towards and into the closed position, as schematically illustrated in FIG. 6, at which point the latch and striker act to secure the tailgate 102 in the closed position. In some embodiments the control module 10 may be configured to move the tailgate 102 towards the closed position at the same time as retracting the platform 2. In this case the control module 10 may be configured to start retracting the platform 2 before commencing closing of the tailgate 102 and/or to retract the platform 2 at a greater angular speed than the closing speed of the tailgate 102 in order to ensure that the tailgate 102 and the platform 2 do not collide during retraction of the platform 2 and closing of the tailgate 102.

Figure 7:
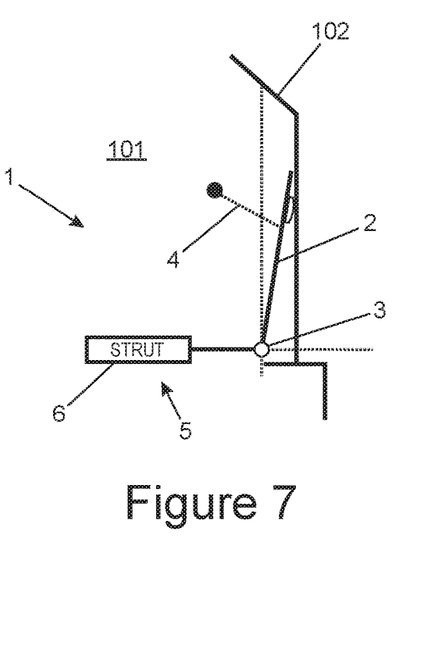

When the tailgate 102 has returned to the closed position, the control module 10 then controls the second actuation system 5 to drive the platform 2 towards and into contact with the inner surface of the closed tailgate 102, as schematically illustrated in FIG. 7, at which point the motor 7 of the second actuation system 5 stalls. When the stall is detected, the control module 10 ceases to power the motor 7 of the second actuation system 5, and the platform 2 is held in the start position (in contact with the tailgate) by friction in the platform hinge 3.

By moving the platform 2 into a temporary stowage position inboard of the start position, it is possible to ensure that the tailgate 102 does not impact the platform 2 while moving into the closed position. In addition, by moving the platform 2 from the temporary stowage position back towards the deployed position and into contact with the tailgate 102 while the tailgate 102 is in the closed position, it is possible to leave the platform 2 in a known final position which may be used as a reference point for monitoring and controlling subsequent movement of the platform 2 during the next deployment cycle.

The control module 10 may be switched off after the tailgate 102 has returned to the closed position and may remain off until the next time opening of the tailgate 102 is requested. The control module 10 is not required to keep monitoring the positions of the tailgate 102 and the platform 2 or retain the last known positions of the tailgate 102 and the platform 2 between closing of the tailgate 102 and the start of the next opening operation because the control module 10 is able to determine the starting positions for the tailgate 102 and the platform 2 in the manner described above.

In an alternative embodiment the control module 10 could equally be configured to leave the platform 2 in the temporary stowage position (or another position inboard of the start position) after the tailgate 102 has returned to the closed position instead of moving the platform 2 into the start position in contact with the tailgate 102 as soon as the tailgate 102 reaches the closed position. In this case the control module 10 could still be switched off or otherwise stop monitoring the position of the platform 2 following closing of the tailgate 102. However, in this case the control module 10 could be configured to automatically move the platform 2 into contact with the tailgate 102 in order to establish a reference start position for the platform 2 before moving the tailgate 102 out of the closed position the next time opening of the tailgate 102 is requested.

In the above-described modes of operation the tailgate 102 and the platform 2 are operated together in response to a single request. However, it is also possible for a user to request opening or closing of the tailgate 102 only or deployment or retraction of the platform 2 only.

For example, if it is desired to open the tailgate 102 while leaving the platform 2 in the start position (for example for use as a catcher to prevent items from falling out of the storage compartment 101 when the tailgate 102 is opened), a user of the vehicle 100 may operate another button located on the dashboard of the vehicle in order to generate a command signal requesting opening of the tailgate 102. The command signal is received at the control module 10, which controls the first actuation system 105 to move the tailgate 102 into the fully open position in the manner described above. In this case the control module 10 does not output any control signal to the second actuation system 5, and the platform 2 remains in the start position due to friction in the platform hinge 3. In some embodiments the control module 10 may be operable to power the motor 7 of the second actuation system 5 while the tailgate 102 is in an open position and the platform 2 has not been deployed in order to more securely locate the platform 2 in the start position (for example to better prevent luggage from falling out of the storage compartment 101 when the tailgate 102 is opened).

If it is desired to deploy the platform 2 while the tailgate 102 is already in the fully open position, a user of the vehicle 100 may operate a button located on the platform 2 while the platform 2 is in the start position in order to generate a command signal requesting deployment of the platform 2. The command signal is received at the control module 10, which controls the second actuation system 5 to move the platform 2 into the deployed position in the manner described above.

Deployment of the platform 2 may also be performed while the tailgate 102 is in an intermediate position between the fully open position and the closed position (including during opening of the tailgate 102). However, if the tailgate 102 is within a certain angle of the closed position it is possible for the platform 2 to impact the tailgate 102 during deployment. The range of positions for the tailgate 102 within which the tailgate 102 may be impacted by the platform 2 during deployment may therefore be regarded as a collision zone. The collision zone may be defined as any position within a predetermined number of sensor signals of the closed position, and may include a safety margin. The control module 10 is configured to determine that the platform 2 should not be deployed if a command signal requesting deployment of the platform 2 is received while the tailgate 102 is in the collision zone, in which case the control module 10 will not control the second actuation system 5 to move the platform 2 into the deployed position. In this way a potential collision between the platform 2 and the tailgate 102 may be avoided.

Similarly, if it is desired to retract the platform 2 while leaving the tailgate 102 open, a user of the vehicle 100 may operate the button on the platform 2 while the platform 2 is in the deployed position in order to generate a command signal requesting retraction of the platform 2. The command signal is received at the control module 10, which controls the second actuation system 5 to move the platform 2 through the start position and into the temporary stowage position in the manner described above. The platform 2 is then retained in the temporary stowage position until the tailgate 102 has returned to the closed position, at which point the control module 10 automatically controls the second actuation system 5 to drive the platform 2 towards and into contact with the inner surface of the closed tailgate 102 to thereby return the platform 2 to the start position. As discussed above, in an alternative embodiment movement of the platform 2 into contact with the tailgate 102 could equally be delayed until the start of the next opening operation for the tailgate 102.

As with deployment of the platform 2 alone, retraction of the platform 2 alone may be carried out either while the tailgate 102 is in the fully open position or alternatively while the tailgate 102 is in an intermediate position between the fully open position and the closed position. However, the control module 10 is configured to determine that the platform 2 should not be retracted if a command signal requesting retraction of the platform 2 is received while the tailgate 102 is in the collision zone, in which case the control module 10 will not control the second actuation system 5 to move the platform 2 into the deployed position. In this way a potential collision between the platform 2 and the tailgate 102 may be avoided.

Finally, if it is desired to close the tailgate 102 when the platform 2 is already in a retracted position (for example if the platform 2 is still in the start position because it was not deployed or if the platform 2 is in the temporary stowage position because it has already been retracted), a user of the vehicle 100 may operate a button located on the tailgate 102 in order to generate a command signal requesting closing of the tailgate 102. The command signal is received at the control module 10, which controls the first actuation system 105 to move the tailgate 102 into the closed position in the manner described above. If the platform 2 is already in the temporary stowage position then the control module 10 may control the second actuation system 5 to drive the platform 2 towards and into contact with the inner surface of the tailgate 102 after the tailgate 102 has returned to the closed position to thereby return the platform 2 to the start position. Alternatively, if the platform 2 is already in the start position when the command signal requesting closing of the tailgate 102 is received, the control module 10 may automatically control the second actuation system 5 to retract the platform 2 into the temporary stowage position before the tailgate 102 reaches the closed position in order to prevent the tailgate 102 from impacting the platform 2 during its closing movement, and then control the second actuation system 5 to drive the platform 2 towards and into contact with the inner surface of the tailgate 102 after the tailgate 102 has returned to the closed position to thereby return the platform 2 to the start position.

If the platform 2 is in the deployed position (or any other position outboard of the start position) then the platform 2 is in a collision zone in which it is possible for the platform 2 to be impacted by the tailgate 102. However, the control module 10 is configured to prevent the tailgate 102 from colliding with the platform 2 by determining that the tailgate 102 should not be closed if a command signal requesting closing of the tailgate 102 is received while the platform 2 is in the collision zone, and in this case the control module 10 will not control the first actuation system 105 to move the tailgate 102 into the closed position. In an alternative embodiment the control module 10 could equally be configured to automatically retract the platform 2 into the temporary stowage position if the platform 2 is determined to be in the collision zone when a request to close the tailgate 102 is received, in which case closing of the tailgate 102 may be carried out as requested.

In the above-described modes of operation the control module 10 controls the first and second actuation systems 105, 5 to move the tailgate 102 and the platform 2 between defined positions (the closed position and the fully open position for the tailgate 102 and the start position and the deployed position for the platform 2). However, it is also possible for the tailgate 102 and the platform 2 to be manually moved into other positions. Since the control module 10 remains awake and continues to monitor the position of both the tailgate 102 and the platform 2 while the tailgate 102 is open, the control module 10 is able to take account of any manual changes in the position of the tailgate 102 and the platform 2 when controlling subsequent movement of the tailgate 102 and the platform 2.

For example, the platform 2 may be moved beyond the deployed position towards the position of maximum possible deployment under loading. In this case the control module 10 determines the new position of the platform 2 by continuing to count sensor signals from the second sensor 8 as the platform 2 is manually moved. The control module 10 is therefore still capable of retracting the platform 2 into the intended temporary stowage position because the real-time position of the platform 2 at the start of the retraction operation is still known. In some embodiments the control module 10 may be configured to move the platform 2 back into the calibrated deployed position after loading has been removed.

The invention has hereinbefore been described in relation to a platform 2 within a storage compartment 101 of a vehicle 100 wherein the platform 2 is moveable such that it can act as a seat or a loading platform, and that is moveable into contact with a tailgate 102 of the vehicle 100. However, embodiments of the invention are also suitable for use with other moveable platforms within vehicles where the moveable platform interacts with an alternative moveable structure of the vehicle. For example, the moveable platform may form part of a cover for a folding seat arrangement positioned beneath the loadfloor of the vehicle.

In this embodiment the folding seat arrangement 25 may be located within a storage compartment 101 and may provide a second or third row of passenger seating within the vehicle 100. This is advantageous as when the second or third row of passengers seats are unoccupied they may be stowed beneath the moveable platform 30 which forms a part of the loadfloor within the storage compartment 101, to provide increased luggage carrying capacity.

The folding seat arrangement 25 will now be described in further detail with reference to FIGS. 9 to 12.

Figure 9:
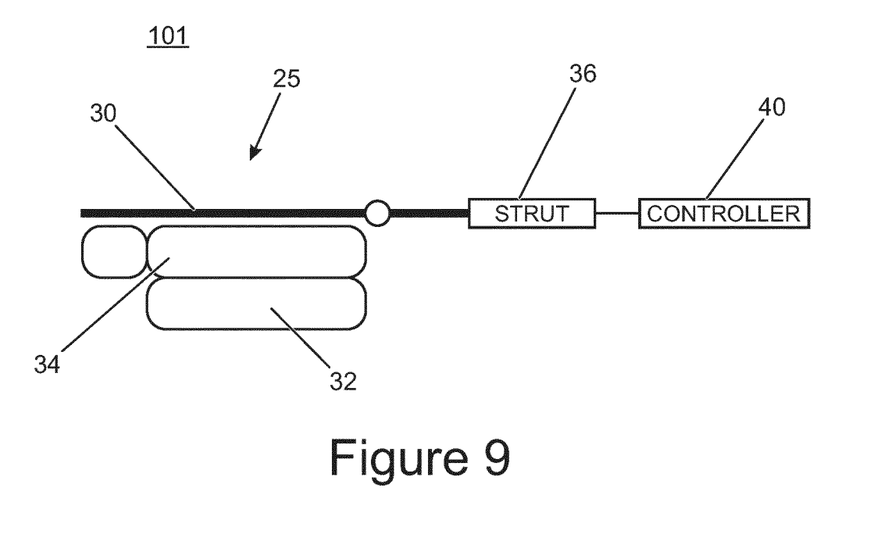
FIG. 9 schematically illustrates a folding seat arrangement, suitable for use with embodiments of the invention, in a folded configuration.
Figure 10:
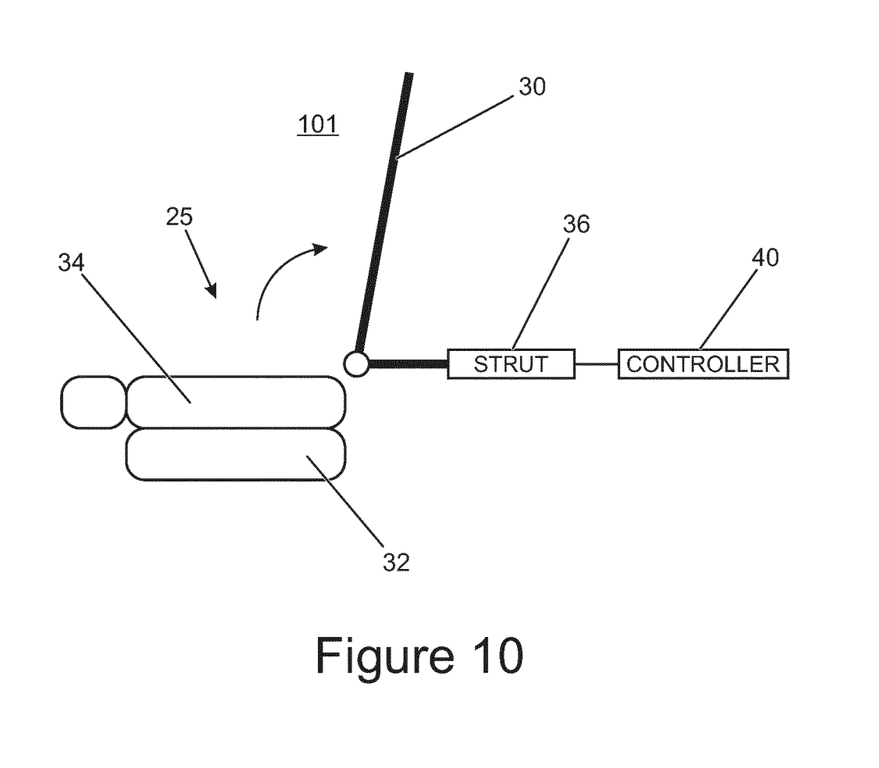
FIGS. 10 and 11 schematically illustrate the folding seat arrangement of FIG. 9 in partially deployed states.
Figure 11:
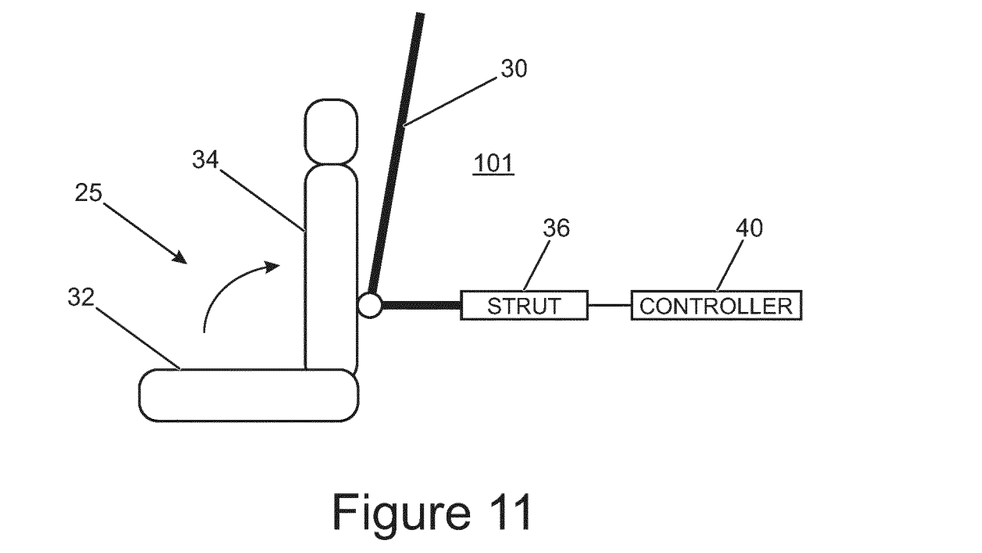
Figure 12:
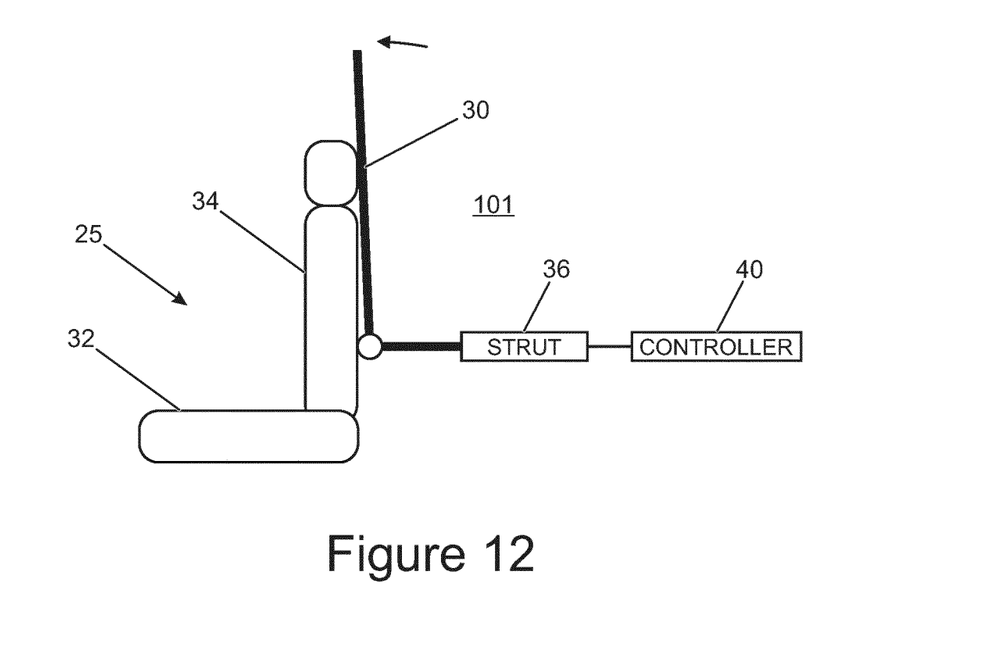
FIG. 12 schematically illustrates the folding seat arrangement of FIG. 9 in a fully deployed state.

Referring firstly to FIG. 9, the folding seat arrangement 25 is illustrated schematically in a stowed configuration. The folding seat arrangement 25 comprises a seat cushion 32 upon which a user of the seating arrangement 25 may sit. A seat back 34 is pivotally connected to the seat cushion 32 and is pivotable between a stowed position, as shown in FIGS. 9 and 10 and a deployed position as shown in FIGS. 11 and 12. In this embodiment the seat back 34 may be considered to be a moveable vehicle structure. When the seat back 34 is in the deployed position the seat back 34 is configured to provide support to a user of the seating arrangements back. The seat back 34 may be moved by an actuator (not shown) such as a DC motor, to move the seat back 34 between the stowed and deployed positions.

A moveable platform 30 is pivotally connected to the vehicle 100 within the storage compartment 101 such that when the seat back 34 is stowed the platform 30 forms part of the loadfloor thus covering the seating arrangement 25. The moveable platform 30 is pivotable between a closed position as shown in FIG. 9 and an open position. When the seat back 34 is in the stowed position the moveable platform 30 acts as a cover for the folding seat arrangement 25 and forms part of the vehicle loadfloor. The moveable platform 30 may thus provide protection to the folding seating arrangement 25 and provide a loadfloor within the storage compartment 101 that users of the vehicle 100 may use to load luggage onto.

Movement of the moveable platform 30 is driven by a platform actuator 36 controlled by a controller 40, for example implemented by way of the control module 10 illustrated in FIG. 8. A user of the vehicle 100 may request movement of the folding seat arrangement 25 by providing an input to the controller 40 via, for example, a button located on a touch screen on the vehicle dashboard. The controller 40 outputs a signal to the platform actuator 36 and the folding seat actuator (not shown) to actuate movement of the folding seat arrangement 25 to the deployed position.

The steps of moving the folding seat arrangement 25 from the stowed configuration to the deployed configuration are outlined in FIGS. 10 to 12.

The controller 40 firstly outputs a control signal to the platform actuator 36 to move the moveable platform 30 from the closed position to the open position as shown in FIG. 10. The actuator 36 drives the platform 30 to a soft stop position which is approximately 10 degrees past an abutting position (as described below). Moving the platform 30 to this position provides space for the seat back 34 to be moved from the stowed position to the deployed position without risking a collision between the moveable platform 30 and the seat back 34.

The controller 40 then provides an output signal to the folding seat actuator (not shown) to actuate movement of the seat back 34 from the stowed position to the deployed position as shown in FIG. 11. In the deployed position the seat back 34 is driven to a hard stop position. In this position the seat back 34 can provide support to the back of a user sat in the seating arrangement 25. The hard stop position may be a latched position wherein the seat back 34 is latched to a fixed component within the storage compartment 101 of the vehicle 100. Driving the seat back 34 to a hard stop position ensures that the controller 40 has an accurate reference location of the seat back 34 when it is in the deployed position, it also provides the advantage of reducing noise and vibrations within the folding seat arrangement 25 as the seat back 34 is held in place against a fixed latch.

Finally the controller 40 outputs a signal to the platform actuator 36 to actuate the moveable platform 30 to an abutting position where the platform 30 abuts the seat back 34. The abutting position is between the closed and the fully open positions. The seat back 34 acts as a hard stop for the moveable platform 30 thus providing a repeatable, known reference position that the moveable platform 30 may be driven to. This is advantageous as it mitigates errors in the position of the moveable platform 30 that could result in the moveable platform 30 being inadvertently driven into another component within the vehicle 100. The controller 40 may measure the current in the platform actuator 36 and cease actuation of the moveable platform 30 when a spike in the current is detected, indicating that the moveable platform 30 has reached the hard stop and is thus in the abutting position. It also provides the advantage of reducing noise and vibrations within the moveable platform 30 as the seat back 34 is held in place against the latched the folding seat arrangement 25.

If a user of the vehicle 100 requests the folding seat arrangement 25 is moved from the deployed position to the stowed position then the controller 40 firstly outputs a signal to actuate movement of the platform 30 from the abutting position to the fully open position as shown in FIG. 11. Advantageously, as the platform 30 is starting in the abutting position, meaning the platform 30 is at a known position, the controller 40 has an accurate reference point for the position of the platform 30 prior to actuation.

When the platform 30 is in the fully open position the controller 40 outputs a control signal to the seat actuator to firstly unlatch the seat back 34 from its hard stop and to subsequently actuate movement of the seat back 34 to the stowed position as is shown in FIG. 10. The controller 40 then outputs a control signal to the platform actuator 36 to actuate movement of the platform 30 from the fully open position, through the abutting position, to the fully closed position as shown in FIG. 9. The fully closed position for the platform 30 is also considered a hard stop position as the platform 30 is driven until it abuts supporting tabs beneath the loadfloor. This provides a known reference position for the platform 30 that may be used by the controller 40 prior to any subsequent actuations of the platform 30.

Many modifications may be made to the above examples without departing from the scope of the present invention as defined in the accompanying claims. For example, in the above-described embodiment the tailgate opens upwardly about a hinge located at its upper edge. However, the present invention is equally applicable to a vehicle having a tailgate that opens sideways about a hinge located along a side edge of the door, or to a vehicle having a split tailgate, for example with a pair of doors that each open sideways about hinges located at their outwardly facing side edges. In addition, in the above-described embodiment the position of maximum possible retraction for the platform is an approximately vertical position. However, in some embodiments the platform may equally be pivotable into a substantially horizontal position extending towards the front of the vehicle along the floor of the storage compartment. Many other variations will also be apparent to the skilled person.

The invention claimed is:

1. A system for a vehicle compartment, comprising:
   a platform that is movable between a first position and a second position, and
   a powered actuator that is controlled to first move the platform from the second position through the first position and into a third position, and then to move the platform from the third position into contact with a moveable structure of the vehicle where the platform is in the first position.

2. The system according to claim 1, wherein the third position is a soft stop position into which the the platform moves before subsequent movement into the first position.

3. The system according to claim 1, comprising a sensor associated with the powered actuator, wherein the sensor is configured to provide a signal indicating a position of the platform.

4. The system according to claim 3, wherein a number of sensor signals from the sensor generated in dependence on movement of the platform and/or operation of the powered actuator indicates a position of the platform.

5. The system according to claim 3, wherein the position of the platform is indicated by movement of the platform relative to a reference point.

6. The system according to claim 1, wherein the first position is a reference point for monitoring movement of the platform.

7. The system according to claim 1, wherein the first position is a reference point for controlling movement of the platform.

8. The system according to claim 1, wherein a change in current and/or voltage at the powered actuator and/or a change in an operating speed of the powered actuator indicates that the platform has moved into contact with the moveable structure.

9. The system according to claim 1, wherein power to the powered actuator stops when the platform has moved into contact with the moveable structure.

10. A system for controlling movement of a platform for a vehicle compartment, wherein the system comprises a powered actuator that is controlled to use a soft start position that is outboard of a position of maximum possible retraction for the platform and in which the platform engages a moveable structure of the vehicle when the moveable structure is in a hard stop position as a reference point for controlling movement of the platform.

11. A platform system for a vehicle, the platform system comprising:
   a platform that is movable between a first position in which the platform engages a moveable structure of the vehicle compartment when the moveable structure is in a hard stop position, and a second position; and
   a powered actuator that is controlled to move the platform between the first position and the second position.

12. The platform system according to claim 11, wherein the platform is pivotably mounted to the vehicle.

13. The platform system according to claim 12, wherein the platform is mounted to the vehicle by a hinge and the hinge is configured to retain the platform in the first position under friction.

14. The platform system according to claim 11, wherein the platform is configured to be used as a seat and/or as a loading platform when in the second position.

15. The platform system according to claim 11, wherein the powered actuator is controlled to move the platform from the second position through the first position to a third position and then to move the platform from the third position to the first position.

16. A vehicle comprising the platform system according to claim 11.

17. A method of moving a platform of a vehicle compartment from a second position to a first position in which the platform engages a moveable structure for the compartment when the moveable structure is in a hard stop position, the method comprising:
   operating a powered actuator to first move the platform from the second position through the first position and into a third position; and then
   operating the powered actuator to move the platform from the third position into contact with the moveable structure to thereby bring the platform into the first position.

18. The method according to claim 17, wherein the first position is a soft start position that is outboard of the third position, and the third position is a position of maximum possible retraction for the platform.

19. The method according to claim 17, further comprising using the first position as a reference point for monitoring and/or controlling movement of the platform.

20. A non-transitory computer readable storage medium comprising computer readable instructions for a computer processor to carry out the method of claim 17.

* * * * *